US010518588B2

(12) United States Patent
Itou

(10) Patent No.: US 10,518,588 B2
(45) Date of Patent: Dec. 31, 2019

(54) PNEUMATIC TIRE

(71) Applicant: The Yokohama Rubber Co., LTD., Minato-ku, Tokyo (JP)

(72) Inventor: Takanori Itou, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 482 days.

(21) Appl. No.: 15/117,163

(22) PCT Filed: Dec. 24, 2014

(86) PCT No.: PCT/JP2014/084041
§ 371 (c)(1),
(2) Date: Aug. 5, 2016

(87) PCT Pub. No.: WO2015/118786
PCT Pub. Date: Aug. 13, 2015

(65) Prior Publication Data
US 2016/0347125 A1    Dec. 1, 2016

(30) Foreign Application Priority Data

Feb. 6, 2014 (JP) ................................. 2014-020868

(51) Int. Cl.
*B60C 11/04* (2006.01)
*B60C 11/13* (2006.01)
(Continued)

(52) U.S. Cl.
CPC .......... *B60C 11/04* (2013.01); *B60C 11/1236* (2013.01); *B60C 11/1315* (2013.01);
(Continued)

(58) Field of Classification Search
CPC ..... B60C 11/04; B60C 11/042; B60C 11/045; B60C 11/1315; B60C 11/1236
See application file for complete search history.

(56) References Cited

U.S. PATENT DOCUMENTS 5,535,798 A * 7/1996 Nakamura .......... B60C 11/0309
152/209.21
5,896,905 A    4/1999 Lurois
(Continued)

FOREIGN PATENT DOCUMENTS

DE    102012104799    * 12/2013
JP    H02-0254003    10/1990
(Continued)

OTHER PUBLICATIONS

English machine translation of JP2008296643. (Year: 2008).*
International Search Report for International Application No. PCT/JP2014/084041 dated Mar. 24, 2015, 4 pages, Japan.

*Primary Examiner* — Robert C Dye
(74) *Attorney, Agent, or Firm* — Thorpe North & Western

(57) ABSTRACT

This pneumatic tire comprises a tread portion, sidewall portions, and bead portions, wherein the tread portion includes five main grooves extending in the tire circumferential direction that partition six rows of ribs, a plurality of first sipes is formed in each edge portion of center ribs, intermediate ribs, and shoulder ribs, a plurality of first narrow grooves is formed in each of the center ribs and the intermediate ribs so as to form a connection between the main grooves, a plurality of second narrow grooves is formed in each of the center ribs and the intermediate ribs so as to connect the first narrow grooves, an interval $Pg_1$ of the first narrow groove is from 20 mm to 60 mm, and an interval $Ps_1$ of the first sipe is from 15% to 45% of the interval $Pg_1$ of the first narrow groove.

15 Claims, 4 Drawing Sheets

(51) Int. Cl.
*B60C 11/12* (2006.01)
*B60C 11/03* (2006.01)

(52) U.S. Cl.
CPC . *B60C 2011/036* (2013.01); *B60C 2011/0344* (2013.01); *B60C 2011/0346* (2013.01); *B60C 2011/0348* (2013.01); *B60C 2011/0353* (2013.01); *B60C 2011/0355* (2013.01); *B60C 2011/0369* (2013.01); *B60C 2011/1209* (2013.01)

(56) References Cited

U.S. PATENT DOCUMENTS

| | | | |
|---|---|---|---|
| 6,142,200 A | 11/2000 | Feider et al. | |
| 6,196,288 B1 * | 3/2001 | Radulescu | B60C 11/0309 |
| | | | 152/209.17 |
| 8,505,601 B2 * | 8/2013 | Harikae | B60C 9/2006 |
| | | | 152/526 |
| 8,875,759 B2 * | 11/2014 | Hamada | B60C 3/04 |
| | | | 152/209.18 |
| 2007/0284026 A1 | 12/2007 | Suzuki | |
| 2009/0283188 A1 * | 11/2009 | Itoh | B60C 11/0309 |
| | | | 152/209.18 |
| 2012/0168048 A1 | 7/2012 | Suganuma | |

FOREIGN PATENT DOCUMENTS

| | | |
|---|---|---|
| JP | 2004-098938 | 4/2004 |
| JP | 2007-326433 | 12/2007 |
| JP | 2008-001293 | 1/2008 |
| JP | 2008-296643 | 12/2008 |
| JP | 2009262888 | * 11/2009 |
| JP | 2010-202109 | 9/2010 |
| WO | WO 2007/148564 | 12/2007 |
| WO | WO 2010/147076 | 12/2010 |

* cited by examiner

PNEUMATIC TIRE
>
> ## TECHNICAL FIELD
>
> The present technology relates to a pneumatic tire provided with a rib-based tread pattern, and particularly relates to a pneumatic tire by which uneven wear resistance can be increased and the formation of cracks and/or fractures in the ribs can be effectively prevented.
>
> ## BACKGROUND ART
>
> Conventionally, in heavy duty pneumatic tires used on trucks, buses, and the like, a rib-based tread pattern is used in which, for example, a tread portion is provided with four main grooves extending in the tire circumferential direction, and five rows of ribs, partitioned by the main grooves and extending in the tire circumferential direction (see Japanese Unexamined Patent Application Publication No. 2008-1293A and International Patent Publication No. WO/2010/147076). In such rib-based tread patterns having four main grooves, typically, the center rib is disposed at the position of the tire equatorial plane.
>
> In contrast, in recent years, wide-base pneumatic tires having an increased development width of the tread portion have been proposed, but in cases where a rib-based tread pattern such as that described above is applied as-is, the width of each of the ribs increases and the rigidity thereof increases. Consequentially, such pneumatic tires are prone to railway wear and similar uneven wear. Additionally, in wide-base pneumatic tires, tire contact pressure across the ribs easily becomes nonuniform, and this type of nonuniform tire contact pressure both promotes uneven wear and is a cause of cracks and/or fractures forming in the ribs.
>
> ## SUMMARY
>
> The present technology provides a pneumatic tire by which uneven wear resistance can be increased and the formation of cracks and/or fractures in the ribs can be effectively prevented.
>
> A pneumatic tire according to the present technology comprises a tread portion extending in a tire circumferential direction and constituting an annular shape, a pair of sidewall portions disposed on both sides of the tread portion, and a pair of bead portions disposed inward in a tire radial direction of the sidewall portions.
>
> In such a pneumatic tire, the tread portion comprises five main grooves extending in the tire circumferential direction and six rows of ribs extending in the tire circumferential direction and partitioned by the main grooves. The ribs are constituted by a pair of center ribs positioned on a tire equatorial plane side, a pair of intermediate ribs positioned outward of each of the center ribs, and a pair of shoulder ribs positioned outward of each of the intermediate ribs. A plurality of first sipes is formed in each edge portion, adjacent to the main groove, of the center ribs, the intermediate ribs, and the shoulder ribs. A plurality of first narrow grooves extending in a tire width direction is formed in each of the center ribs and the intermediate ribs so as to form a connection between the main grooves, and a plurality of second narrow grooves extending in the tire circumferential direction is formed in each of the center ribs and the intermediate ribs so as to connect neighboring first narrow grooves. An interval $Pg_1$ in the tire circumferential direction of the first narrow groove is from 20 mm to 60 mm; and an interval $Ps_1$ in the tire circumferential direction of the first sipe is from 15% to 45% of the interval $Pg_1$ of the first narrow groove. A ratio Wa/TDW of a width Wa of the center ribs to a development width TDW of the tread portion is from 0.08 to 0.18; a ratio Wb/TDW of a width Wb of the intermediate ribs to the development width TDW of the tread portion is from 0.08 to 0.18; and a ratio Wc/Wa of a width Wc of the shoulder ribs to the width Wa of the center ribs is from 1.20 to 1.30.
>
> In the present technology, a rib-based tread pattern is used having five main grooves and the plurality of first sipes is formed in each of the edge portions, which are adjacent to the main grooves, of the center ribs, the intermediate ribs, and the shoulder ribs. As a result, frictional energy generated in each edge portion of each rib can be released via the first sipes. Additionally, the plurality of first narrow grooves extending in the tire width direction is formed in each of the center ribs and the intermediate ribs so as to form a connection between the main grooves, and the plurality of second narrow grooves extending in the tire circumferential direction is formed so as to connect neighboring first narrow grooves. Thereby, the rigidity of the center ribs and the intermediate ribs can be alleviated. As a result, uneven wear resistance can be increased and the formation of cracks and/or fractures in the ribs can be effectively prevented. Additionally, by optimizing the width Wa of the center ribs, the width Wb of the intermediate ribs, and the width Wc of the shoulder ribs with respect to the development width TDW of the tread portion, tire contact pressure across the ribs can be made uniform, and the effects of improving uneven wear resistance, cracking resistance, and fracturing resistance can be increased.
>
> In the present technology, a length $Ls_1$ of the first sipe is preferably from 1.5 to 8.0 mm, and a ratio $Ds_1$/GD of a depth $Ds_1$ of the first sipe to a depth GD of the main grooves is preferably from 0.30 to 0.90. As a result, the effects of improving uneven wear resistance, cracking resistance, and fracturing resistance can be increased.
>
> The first narrow groove preferably locally deepens at an intermediate portion in the longitudinal direction, the second narrow groove preferably locally deepens at a connecting portion with the first narrow groove, and a ratio $Dg_1$/GD of a depth $Dg_1$ of the intermediate portion of the first narrow groove to the depth GD of the main grooves and a ratio $Dg_2$/GD of a depth $Dg_2$ of the connecting portion of the second narrow groove to the depth GD of the main grooves are each preferably from 0.30 to 0.80. As a result, rigidity of the center ribs and the intermediate ribs can be appropriately maintained.
>
> A plurality of second sipes is preferably formed in an outer side edge portion of the shoulder ribs, an interval $Ps_2$ in the tire circumferential direction of the second sipe is preferably from 3.0 mm to 12.0 mm, and a length $Ls_2$ of the second sipe is preferably from 5.0 mm to 15 mm. As a result, uneven wear resistance in the shoulder ribs can be improved.
>
> It is preferable that a structure be employed wherein the main groove positioned between the center ribs is formed to be straight, a plurality of protrusions is formed periodically on both wall surfaces of the other main grooves so as to cause a groove bottom portion of the main grooves to meander, and a ratio Px/$Pg_1$ of an interval Px in the tire circumferential direction of the protrusion to the interval $Pg_1$ in the tire circumferential direction of the first narrow groove is preferably from 0.5 to 2.0. By periodically forming the plurality of protrusions on both wall surfaces of the outer main grooves, rigidity of each of the ribs can be appropriately maintained and the effect of improving fracturing resistance can be increased.

An inclination angle $\theta_1$ of the first narrow groove with respect to the tire circumferential direction is preferably from 40° to 90°; and an inclination angle $\theta_2$ of the second narrow groove with respect to the tire circumferential direction is preferably from 0° to 40°. As a result, rigidity of the center ribs and the intermediate ribs can be appropriately maintained.

Additionally, a circumferential reinforcing layer comprising a reinforcing cord oriented in the tire circumferential direction is preferably embedded in the tread portion. As a result, hoop effect in the tread portion can be increased and the tire contact pressure across the ribs can be made even more uniform.

In the present technology, the "development width TDW of the tread portion" is defined as a width from one edge in the tire width direction of the tread portion to the other edge, and is a width measured along the road contact surface of the tread portion. Additionally, the width Wa of the center ribs, the width Wb of the intermediate ribs, and the width Wc of the shoulder ribs are each widths that are measured along the road contact surface of the tread portion. Furthermore, the length $Ls_1$ of the first sipe and the length $Ls_2$ of the second sipe are each lengths measured in a direction orthogonal to the road contact surface of the tread portion.

DETAILED DESCRIPTION

Figure 1:
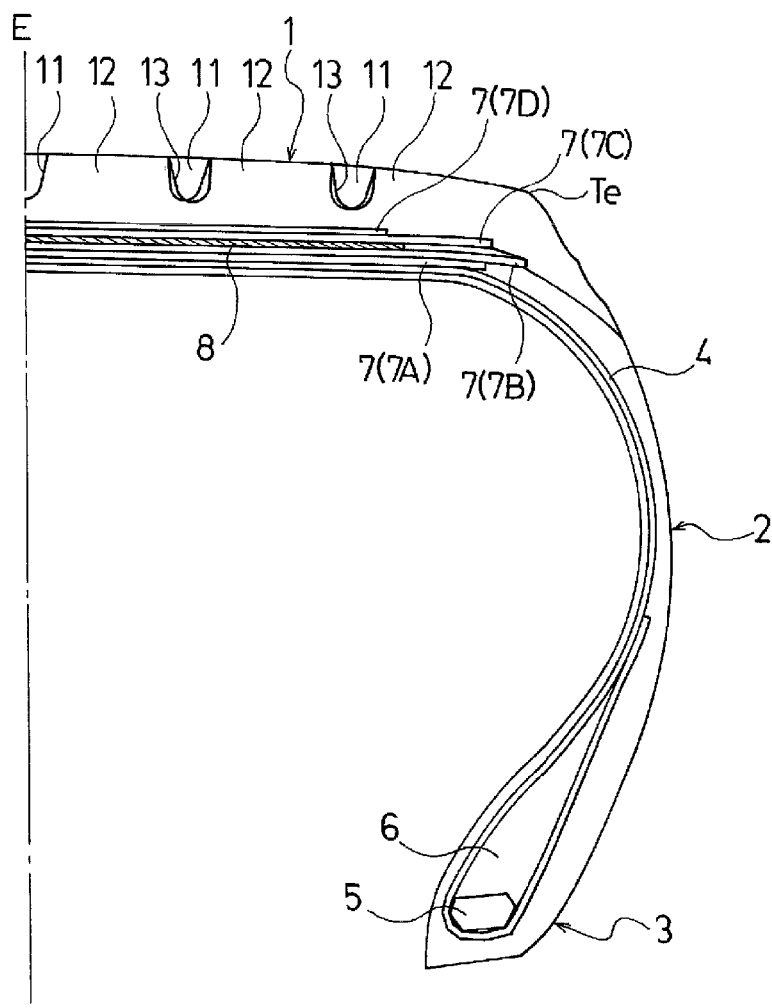
FIG. 1 is a meridian cross-sectional view illustrating the pneumatic tire according to an embodiment of the present technology.

A configuration of the present technology will be described below in detail with reference to the accompanying drawings. FIGS. 1 to 6 illustrate a pneumatic tire according to an embodiment of the present technology. As illustrated in FIG. 1, a pneumatic tire of this embodiment is provided with a tread portion 1 extending in the tire circumferential direction to form an annular shape, a pair of sidewall portions 2, 2 that is disposed on both sides of the tread portion 1, and a pair of bead portions 3, 3 that is disposed on the inner side in the tire radial direction of the sidewall portions 2.

A carcass layer 4 is mounted between the pair of bead portions 3, 3. The carcass layer 4 includes a plurality of reinforcing cords extending in the tire radial direction and is folded back around bead cores 5 disposed in each of the bead portions 3 from a tire inner side to a tire outer side. A bead filler 6 having a triangular cross-sectional shape formed from a rubber composition is disposed on a periphery of the bead cores 5.

On the other hand, a plurality of belt layers 7 (7A, 7B, 7C, 7D) are embedded in the outer peripheral side of the carcass layer 4 in the tread portion 1. These belt layers 7A to 7D include a plurality of reinforcing cords inclined with respect to the tire circumferential direction and arranged such that the reinforcing cords intersect with each other between the layers. In the belt layers 7A to 7D, the inclination angle of the reinforcing cords with respect to the tire circumferential direction is set to, for example, a range of 10 to 60°. Steel cords are preferably used as the reinforcing cords of the belt layers 7A to 7D. Additionally, in order to increase the hoop effect in the tread portion 1, a circumferential reinforcing layer 8 comprising reinforcing cords arranged at an angle of, for example, 5° or less with respect to the tire circumferential direction is disposed between the second belt layer 7B and the third belt layer 7C, counted from the carcass layer 4 side. Preferably, steel cords are used as the reinforcing cords of the circumferential reinforcing layer 8, but organic fiber cords such as aramid fiber cords and the like can also be used.

Figure 2:
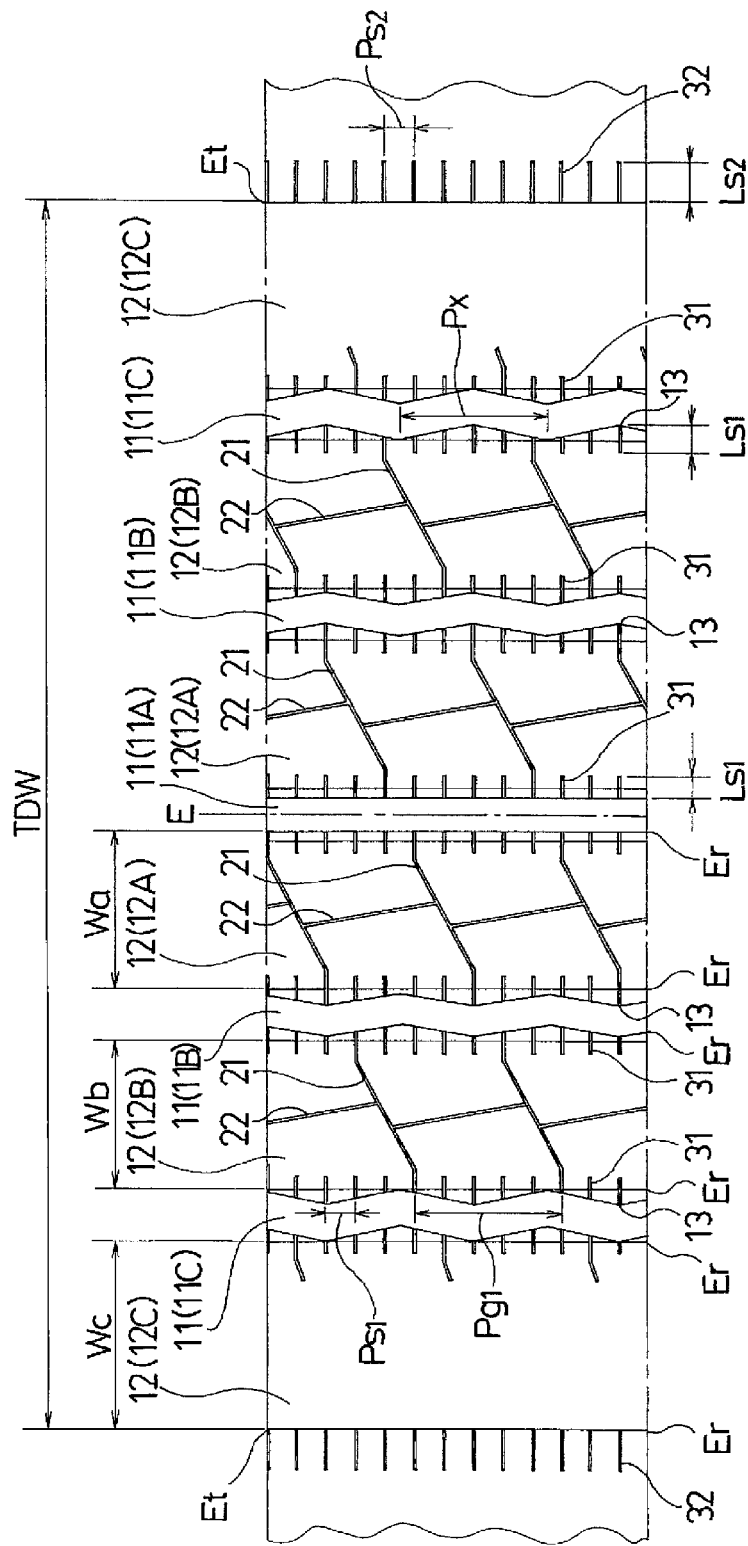
FIG. 2 is a developed view illustrating a tread pattern of the pneumatic tire according to the embodiment of the present technology.

In FIG. 2, the development width TDW of the tread portion 1 is the width from a first edge Et in the tire width direction of the tread portion 1 to a second edge Et, and it should be understood that the pneumatic tire of the present embodiment is a wide-base tire wherein the development width TDW is set in a range from 280 mm to 400 mm. The development width TDW is not limited to the range described above, but the present technology is particularly effective when the development width TDW is within the above-described range.

As illustrated in FIG. 2, five circumferential grooves 11 (11A, 11B, 11C) extending in the tire circumferential direction are formed in the tread portion 1, and six rows of ribs 12 (12A, 12B, 12C) extending continuously in the tire circumferential direction are partitioned by these circumferential grooves 11. Specifically, the main grooves 11 include a main groove 11A positioned on the tire equatorial plane E, a pair of main grooves 11B positioned outward of the main groove 11A, and a pair of main grooves 11C positioned outward of each of the main grooves 11B. The ribs 12 include a pair of center ribs 12A positioned on both sides of the tire equatorial plane E, a pair of intermediate ribs 12B positioned outward of each of the center ribs 12A, and a pair of shoulder ribs 12C positioned outward of each of the intermediate ribs 12B.

The main groove 11A positioned between the center ribs 12A is formed so as to be straight, and a plurality of protrusions 13 is formed periodically on both wall surfaces of each of the other main grooves 12B and 12C so as to cause groove bottom portion of the main grooves 12B and 12C to meander. Note that each of the center ribs 12A, the intermediate ribs 12B, and the shoulder ribs 12C have an edge Er at positions on both ends in the tire width direction of the road contact surface, and both of the wall surfaces of the main grooves 11A, 11B, and 11C form an inclined surface from the corresponding edge toward the groove bottom.

In the pneumatic tire described above, the ratio Wa/TDW of a width Wa of the center ribs 12A to the development width TDW of the tread portion 1 is set in a range from 0.08 to 0.18, a ratio Wb/TDW of a width Wb of the intermediate ribs 12B to the development width TDW of the tread portion 1 is set in a range from 0.08 to 0.18, and a ratio Wc/Wa of a width Wc of the shoulder ribs 12C to the width Wa of the center ribs 12A is set in a range from 1.20 to 1.30.

A plurality of first narrow grooves 21 extending in the tire width direction is formed at an interval in the tire circumferential direction in each of the center ribs 12A and the intermediate ribs 12B so as to form a connection between the main grooves 11 and 11, which are neighboring in the tire width direction. Furthermore, a plurality of second narrow grooves 22 extending in the tire circumferential direction is formed in each of the center ribs 12A and the intermediate ribs 12B so as to connect the first narrow grooves 21 and 21, which are neighboring in the tire circumferential direction. Moreover, an interval $Pg_1$ in the tire circumferential direction of the first narrow groove 21 is set in a range from 20 mm to 60 mm.

A plurality of first sipes 31 is formed in each edge portion, adjacent to the main grooves 11, of the center ribs 12A, the intermediate ribs 12B, and the shoulder ribs 12C. Each of the first sipes 31 has a first end open to the main groove 11 and a second end terminating in the rib 12. Moreover, an interval $Ps_1$ in the tire circumferential direction of the first sipe 31 is set in a range from 15% to 45% of the interval $Pg_1$ of the first narrow groove 21.

In the pneumatic tire described above, in order to increase the development width TDW of the tread portion 1, a rib-based tread pattern is used having five main grooves 11 and the plurality of first sipes 31 is formed in each of the edge portions, which are adjacent to the main grooves 11, of the center ribs 12A, the intermediate ribs 12B, and the shoulder ribs 12C. As a result, frictional energy generated in each edge portion of each of the ribs 12 can be released via the first sipes 31. Additionally, the plurality of first narrow grooves 21 extending in the tire width direction is formed in each of the center ribs 12A and the intermediate ribs 12B so as to form a connection between the main grooves 11 and 11, and the plurality of second narrow grooves 22 extending in the tire circumferential direction is formed so as to connect neighboring first narrow grooves 21 and 21. Thereby, the rigidity of the center ribs 12A and the intermediate ribs 12B can be alleviated. As a result, uneven wear resistance can be increased and the formation of cracks and/or fractures in the ribs 12 can be effectively prevented. Additionally, by optimizing the width Wa of the center ribs 12A, the width Wb of the intermediate ribs 12B, and the width Wc of the shoulder ribs 12C with respect to the development width TDW of the tread portion 1, tire contact pressure across the ribs 12 can be made uniform, and the effects of improving uneven wear resistance, cracking resistance, and fracturing resistance can be increased.

Here, if the ratio Wa/TDW specified by the width Wa of the center ribs 12A, the ratio Wb/TDW specified by the width Wb of the intermediate ribs 12B, and the ratio Wc/Wa specified by the width Wc of the shoulder ribs 12C are outside the ranges described above, making the tire contact pressure across the ribs 12 uniform will be difficult. Additionally, if the interval $Pg_1$ in the tire circumferential direction of the first narrow groove 21 is smaller than 20 mm, the rigidity of the ribs 12 will decline excessively, resulting in a decrease in cracking resistance and fracturing resistance; and if larger than 60 mm, the rigidity of the ribs 12 will increase, leading to a decrease in uneven wear resistance. Moreover, if the interval $Ps_1$ in the tire circumferential direction of the first sipe 31 is smaller than 15% of the interval $Pg_1$ of the first narrow groove 21, the rigidity of the edge portions of the ribs 12 will decline excessively, resulting in a decrease in cracking resistance and fracturing resistance; and if larger than 45%, the rigidity of the edge portions of the ribs 12 will increase, leading to a decrease in uneven wear resistance.

In the present technology, it is advantageous that a length $Ls_1$ of the first sipe 31 (see FIG. 2) be from 1.5 to 8.0 mm, and a ratio $Ds_1/GD$ of a depth $Ds_1$ of the first sipe 31 to a depth GD of the main grooves 11 (see FIG. 4) be from 0.30 to 0.90. As a result, the effects of improving uneven wear resistance, cracking resistance, and fracturing resistance can be increased. Here, if the length $Ls_1$ of the first sipe 31 is less than 1.5 mm, the rigidity of the edge portions of the ribs 12 will increase, leading to a decrease in the effect of improving uneven wear resistance; and if greater than 8.0 mm, the rigidity of the edge portions of the ribs 12 will excessively decrease, leading to a decrease in the effects of improving cracking resistance and fracturing resistance. Here, if the ratio $Ds_1/GD$ of the depth $Ds_1$ of the first sipe 31 to the depth GD of the main grooves 11 is less than 0.30, the rigidity of the edge portions of the ribs 12 will increase, leading to a decrease in the effect of improving uneven wear resistance; and if greater than 0.90, the rigidity of the edge portions of the ribs 12 will excessively decrease, leading to a decrease in the effects of improving cracking resistance and fracturing resistance.

Figure 6:
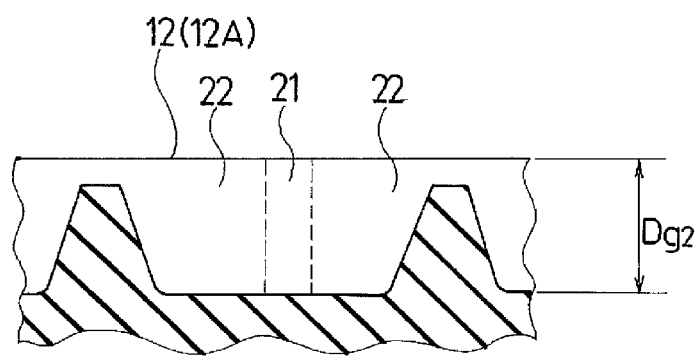
FIG. 6 is a cross-sectional view taken along the line VI-VI of FIG. 3.

In the pneumatic tire described above, as illustrated in FIG. 5, the first narrow groove 21 is deeper locally at an intermediate portion in the longitudinal direction than at other portions. However, in FIG. 5, due to the fact that the first sipe 31 is connected to both ends of the first narrow groove 21, the portion of the first sipe 31 also deepens in accordance with the intermediate portion. Additionally, as illustrated in FIG. 6, the second narrow groove 22 is deeper locally at the connecting portion with the first narrow groove 21 than at other portions. Moreover, it is advantageous that a ratio $Dg_1/GD$ of a depth $Dg_1$ of the intermediate portion of the first narrow groove 21 to the depth GD of the main grooves 11 and a ratio $Dg_2/GD$ of a depth $Dg_2$ of the connecting portion of the second narrow groove 22 to the depth GD of the main grooves 11 each be from 0.30 to 0.80. As a result, rigidity of the center ribs 12A and the intermediate ribs 12B can be appropriately maintained. Here, if the ratio $Dg_1/GD$ or the ratio $Dg_2/GD$ is less than 0.30, the rigidity of the ribs 12 will increase, leading to a decrease in the effect of improving uneven wear resistance; and if greater than 0.80, the rigidity of the ribs 12 will excessively decrease, leading to a decrease in the effects of improving cracking resistance and fracturing resistance.

The depth GD of the main grooves 11 is not particularly limited, and may, for example, be selected from a range of 11 mm to 16 mm. Likewise, the width at the road contact surface of the main grooves 11 is not particularly limited, and may, for example, be selected from a range of 10 mm to 25 mm.

In the pneumatic tire described above, a plurality of second sipes 32 is formed in an outer side edge portion of the shoulder ribs 12C. Each of the second sipes has a first end open to the main groove 11C and a second end terminating in the rib 12C. Moreover, it is advantageous that an interval $Ps_2$ in the tire circumferential direction of the second sipe 32 be from 3.0 mm to 12.0 mm, and a length $Ls_2$ of the second sipe 32 be from 5.0 mm to 15 mm. As a result, uneven wear resistance in the shoulder ribs 12C can be improved. If the interval $Ps_2$ of the second sipe 32 is less than 3.0 mm, the rigidity of the edge portions of the shoulder ribs 12C will decline excessively, resulting in a decrease in cracking resistance and fracturing resistance; and if greater than 12.0 mm, the rigidity of the edge portions of the shoulder ribs 12C will increase, leading to a decrease in uneven wear resistance.

In the pneumatic tire described above, it is advantageous that a structure be provided wherein the main groove 11A positioned between the center ribs 12A and 12A is formed to be straight, a plurality of protrusions 13 is formed periodically on both wall surfaces of the other main grooves 11B and 11C so as to cause a groove bottom portion of the main grooves 11B and 11C to meander, and a ratio $Px/Pg_1$ of an interval Px in the tire circumferential direction of the protrusions 13 to the interval $Pg_1$ in the tire circumferential direction of the first narrow groove 21 is from 0.5 to 2.0. By periodically forming the plurality of protrusions 13 on both wall surfaces of the outer main grooves 11B and 11C, rigidity of each of the ribs 12 can be appropriately maintained and the effect of improving fracturing resistance can be increased. That is, movement of each of the ribs 12 can be suppressed by providing the periodically disposed protrusion 13. Moreover, because the length $Ls_1$ of the first sipes 31 changes along the tire circumferential direction so as to become relatively longer at the positions of the protrusions 13, excellent uneven wear resistance can be ensured even in the structure described above.

Figure 3:
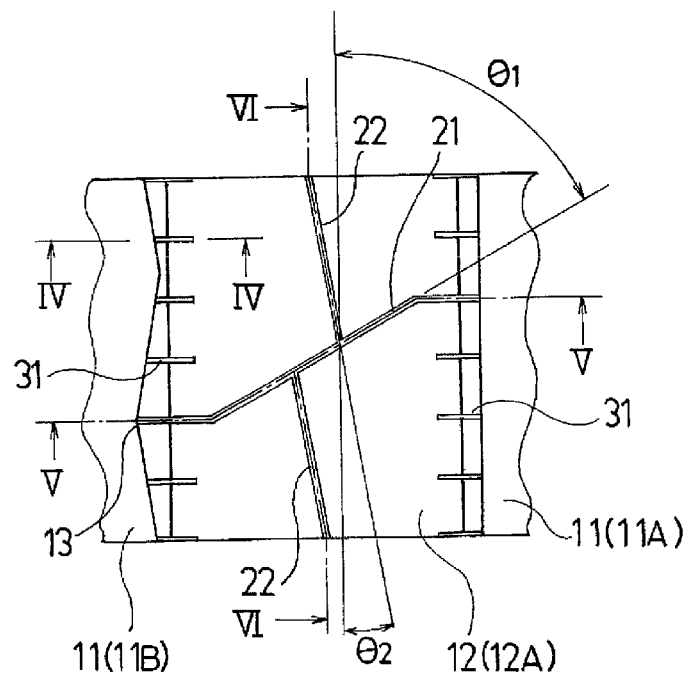
FIG. 3 is a plan view in which a center rib of the pneumatic tire illustrated in FIG. 2 is isolated and illustrated.
Figure 4:
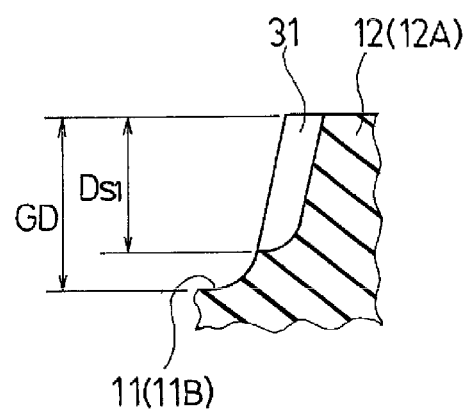
FIG. 4 is a cross-sectional view taken along the line IV-IV of FIG. 3.
Figure 5:
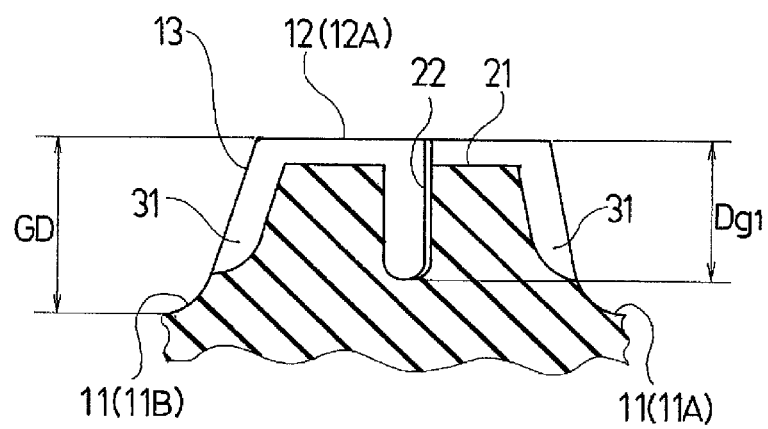
FIG. 5 is a cross-sectional view taken along the line V-V of FIG. 3.

As illustrated in FIG. 3, an inclination angle $\theta_1$ of the first narrow groove 21 with respect to the tire circumferential direction is preferably from 40° to 90°; and an inclination angle $\theta_2$ of the second narrow groove 22 with respect to the tire circumferential direction is preferably from 0° to 40°. As a result, rigidity of the center ribs 12A and the intermediate ribs 12B can be appropriately maintained. Here, if the inclination angle $\theta_1$ of the first narrow groove 21 is less than 40°, the rigidity of the ribs 12 will excessively decrease, leading to a decrease in the effects of improving cracking resistance and fracturing resistance; and likewise, if the inclination angle $\theta_2$ of the second narrow groove 22 is less than 40°, the rigidity of the ribs 12 will excessively decrease, leading to a decrease in the effects of improving cracking resistance and fracturing resistance. Note that the first narrow groove 21 and the second narrow groove 22 are preferably inclined in directions opposite each other with respect to the tire circumferential direction.

Additionally, in the pneumatic tire described above, in order to increase the development width TDW, the circumferential reinforcing layer 8 including reinforcing cords arranged in the tire circumferential direction is embedded in the tread portion 1 and, as a result, hoop effect of the tread portion 1 can be increased and the tire contact pressure across the ribs 12 can be made even more uniform. Thus, due to the synergistic effects of the addition of the circumferential reinforcing layer 8 and the specifications of the tread pattern, maximum effects of improving uneven wear resistance, cracking resistance, and fracturing resistance can be achieved.

EXAMPLES

Various differing tires of Conventional Example 1 and Working Examples 1 to 8 were fabricated having a common tire size of 355/50R22.5. The pneumatic tires comprised a tread portion extending in a tire circumferential direction and constituting an annular shape, a pair of sidewall portions disposed on both sides of the tread portion, and a pair of bead portions disposed inward in a tire radial direction of the sidewall portions. The tread portion comprised five main grooves extending in the tire circumferential direction and six rows of ribs extending in the tire circumferential direction and partitioned by the main grooves. A plurality of first sipes was formed in each edge portion, adjacent to the main groove, of center ribs, intermediate ribs, and shoulder ribs. A plurality of first narrow grooves extending in a tire width direction was formed in each of the center ribs and the intermediate ribs so as to form a connection between the main grooves. A plurality of second narrow grooves extending in the tire circumferential direction was formed in each of the center ribs and the intermediate ribs so as to connect neighboring first narrow grooves. Moreover, an interval $Pg_1$ in the tire circumferential direction of the first narrow groove, a ratio $Ps_1/Pg_1$ of an interval $Ps_1$ of the first sipe with respect to the interval $Pg_1$ of the first narrow groove, a ratio Wa/TDW of a width Wa of the center ribs to a development width TDW of the tread portion, a ratio Wb/TDW of a width Wb of the intermediate ribs to the development width TDW of the tread portion, a ratio Wc/Wa of a width Wc of the shoulder ribs to the width Wa of the center ribs, and the presence or absence of a circumferential reinforcing layer embedded in the tread portion were varied as shown in Table 1.

In Conventional Example 1 and Working Examples 1 to 8, the length Ls of the first sipe was set to 3.0 mm, the ratio $Ds_1/GD$ of the depth $Ds_1$ of the first sipe to the depth GD of the main grooves was set to 0.7, the ratio $Dg_1/GD$ of the depth $Dg_1$ of the intermediate portion of the first narrow groove to the depth GD of the main grooves and the ratio $Dg_2/GD$ of the depth $Dg_2$ of the connecting portion of the second narrow groove to the depth GD of the main grooves were each set to 0.7, the inclination angle $\theta_1$ of the first narrow groove with respect to the tire circumferential direction was set to 60°, and the inclination angle $\theta_2$ of the second narrow groove with respect to the tire circumferential direction was set to 20°. Additionally, for comparison, a tire for Comparative Example 1, in which the second narrow groove and the first sipe were not provided, was prepared.

These test tires were evaluated for uneven wear resistance and cracking and fracturing resistance according to the following evaluation methods. The results thereof are shown in Table 1.

Uneven Wear Resistance:

Each of the test tires (355/50R22.5) was assembled on a wheel having a rim size of 22.5×11.75, inflated to an air pressure of 900 kPa, and mounted on the steering wheel of a truck carrying a 10-ton load. The amount of uneven wear of each rib after traveling 5000 km on roads (80% on freeways and 20% on local roads) was measured. The evaluation results were expressed, using the inverse value of the measurement value, as an index with the Conventional Example being 100. Larger index values indicate superior uneven wear resistance.

Cracking and Fracturing Resistance:

After the traveling test described above, the total length of crack portion and fracture portion formed in the ribs of each of the tires was measured. The evaluation results were expressed, using the inverse value of the measurement value, as an index with the Conventional Example being 100. Larger index values indicate superior cracking and fracturing resistance.

TABLE 1

|  | Conventional Example 1 | Comparative Example 1 | Working Example 1 | Working Example 2 | Working Example 3 |
|---|---|---|---|---|---|
| Interval $Pg_1$ (mm) of First Narrow Groove | 35 | 30 | 35 | 20 | 45 |
| Presence/Absence of Second Narrow Groove | Present | Absent | Present | Present | Present |

TABLE 1-continued

| | | | | | |
|---|---|---|---|---|---|
| Presence/Absence of First Sipe | Present | Absent | Present | Present | Present |
| Ratio Ps1/Pg1 of Interval of First Sipe | 0.10 | — | 0.25 | 0.25 | 0.25 |
| Ratio Wa/TDW of Width of Center ribs | 0.10 | 0.12 | 0.13 | 0.13 | 0.13 |
| Ratio Wb/TDW of Width of Intermediate Ribs | 0.10 | 0.12 | 0.13 | 0.13 | 0.13 |
| Ratio Wc/Wa of Width of Shoulder Ribs | 1.51 | 1.25 | 1.25 | 1.25 | 1.25 |
| Presence/Absence of Circumferential Reinforcing Layer | Present | Present | Present | Present | Present |
| Uneven Wear Resistance | 100 | 98 | 105 | 105 | 105 |
| Cracking and Fracturing Resistance | 100 | 100 | 105 | 105 | 105 |

| | Working Example 4 | Working Example 5 | Working Example 6 | Working Example 7 | Working Example 8 |
|---|---|---|---|---|---|
| Interval $Pg_1$ (mm) of First Narrow Groove | 35 | 35 | 35 | 35 | 35 |
| Presence/Absence of Second Narrow Groove | Present | Present | Present | Present | Present |
| Presence/Absence of First Sipe | Present | Present | Present | Present | Present |
| Ratio Ps1/Pg1 of Interval of First Sipe | 0.15 | 0.45 | 0.25 | 0.25 | 0.25 |
| Ratio Wa/TDW of Width of Center ribs | 0.13 | 0.13 | 0.08 | 0.18 | 0.13 |
| Ratio Wb/TDW of Width of Intermediate Ribs | 0.13 | 0.13 | 0.08 | 0.18 | 0.13 |
| Ratio Wc/Wa of Width of Shoulder Ribs | 1.25 | 1.25 | 1.30 | 1.20 | 1.25 |
| Presence/Absence of Circumferential Reinforcing Layer | Present | Present | Present | Present | Absent |
| Uneven Wear Resistance | 108 | 103 | 105 | 105 | 103 |
| Cracking and Fracturing Resistance | 103 | 108 | 105 | 105 | 103 |

As is clear from Table 1, compared with Conventional Example 1, with each of the tires of Working Examples 1 to 8, uneven wear resistance and cracking and fracturing resistance were superior.

Next, Working Examples 9 to 16 were prepared which had the same structure as Working Example 1, with the exceptions that the length $Ls_1$ of the first sipe, the ratio $Ds_1/GD$ of the depth $Ds_1$ of the first sipe to the depth GD of the main grooves, the ratio $Dg_1/GD$ of the depth $Dg_1$ of the intermediate portion of the first narrow groove to the depth GD of the main grooves and the ratio $Dg_2/GD$ of the depth $Dg_2$ of the connecting portion of the second narrow groove to the depth GD of the main grooves were varied.

These test tires were evaluated for uneven wear resistance and cracking and fracturing resistance according to the evaluation methods described above. The results thereof are shown in Table 2.

TABLE 2

| | Working Example 9 | Working Example 10 | Working Example 11 | Working Example 12 | Working Example 13 | Working Example 14 | Working Example 15 | Working Example 16 |
|---|---|---|---|---|---|---|---|---|
| Length $Ls_1$ (mm) of First Sipe | 1.5 | 6.5 | 3.0 | 3.0 | 3.0 | 3.0 | 3.0 | 3.0 |
| Ratio $Ds_1/GD$ of Depth of First Sipe | 0.7 | 0.7 | 0.3 | 0.9 | 0.7 | 0.7 | 0.7 | 0.7 |
| Ratio $Dg_1/GD$ of Intermediate Portion Depth of First Narrow Groove | 0.7 | 0.7 | 0.7 | 0.7 | 0.3 | 0.4 | 0.6 | 0.8 |
| Ratio $Dg_2/GD$ of Intermediate Portion Depth of Second Narrow Groove | 0.7 | 0.7 | 0.7 | 0.7 | 0.3 | 0.4 | 0.6 | 0.8 |
| Uneven Wear Resistance | 106 | 110 | 102 | 110 | 110 | 112 | 112 | 112 |
| Cracking and Fracturing Resistance | 108 | 102 | 110 | 102 | 105 | 105 | 105 | 103 |

As is clear from Table 2, compared with Conventional Example 1, with each of the tires of Working Examples 9 to 16, uneven wear resistance and cracking and fracturing resistance were superior.

Next, Working Examples 17 to 28 were prepared which had the same structure as Working Example 1, with the exceptions that the plurality of second sipes was formed in the outer side edge portion of the shoulder ribs and the interval $Ps_2$ in the tire circumferential direction and the length $Ls_2$ of the second sipe were varied, the plurality of protrusions was periodically formed on both wall surfaces of the outer main grooves so as to provide a structure in which the groove bottom portion of the main grooves is caused to meander and the ratio $Px/Pg_1$ of the interval $Px$ in the tire circumferential direction of the protrusion to the interval $Pg_1$ in the tire circumferential direction of the first narrow groove were varied, and the inclination angle $\theta_1$ of the first narrow groove with respect to the tire circumferential direction and the inclination angle $\theta_2$ of the second narrow groove with respect to the tire circumferential direction were varied.

These test tires were evaluated for uneven wear resistance and cracking and fracturing resistance according to the evaluation methods described above. The results thereof are shown in Tables 3 and 4.

TABLE 3

|  | Working Example 17 | Working Example 18 | Working Example 19 | Working Example 20 | Working Example 21 | Working Example 22 |
| --- | --- | --- | --- | --- | --- | --- |
| Interval $Ps_2$ (mm) of Second Sipe | 3.0 | 5.0 | 12.0 | 5.0 | 5.0 | 5.0 |
| Length $Ls_2$ (mm) of Second Sipe | 5.0 | 10.0 | 15.0 | 10.0 | 10.0 | 10.0 |
| Ratio $Px/Pg_1$ of Interval of Protrusion | 2.5 | 2.5 | 2.5 | 0.50 | 1.00 | 2.00 |
| Inclination Angle of First Narrow Groove (°) | 30 | 30 | 30 | 30 | 30 | 30 |
| Inclination Angle of Second Narrow Groove (°) | 50 | 50 | 50 | 50 | 50 | 50 |
| Uneven wear resistance | 114 | 116 | 118 | 116 | 116 | 116 |
| Cracking and Fracturing Resistance | 105 | 104 | 103 | 108 | 108 | 108 |

TABLE 4

|  | Working Example 23 | Working Example 24 | Working Example 25 | Working Example 26 | Working Example 27 | Working Example 28 |
| --- | --- | --- | --- | --- | --- | --- |
| Interval $Ps_2$ (mm) of Second Sipe | 5.0 | 5.0 | 5.0 | 5.0 | 5.0 | 5.0 |
| Length $Ls_2$ (mm) of Second Sipe | 10.0 | 10.0 | 10.0 | 10.0 | 10.0 | 10.0 |
| Ratio $Px/Pg_1$ of Interval of Protrusion | 1.00 | 1.00 | 1.00 | 1.00 | 1.00 | 1.00 |
| Inclination Angle of First Narrow Groove (°) | 40 | 60 | 90 | 60 | 60 | 60 |
| Inclination Angle of Second Narrow Groove (°) | 50 | 50 | 50 | 40 | 20 | 0 |
| Uneven wear resistance | 118 | 118 | 118 | 120 | 120 | 120 |
| Cracking and Fracturing Resistance | 108 | 108 | 108 | 108 | 108 | 108 |

As is clear from Tables 3 and 4, compared with Conventional Example 1, with each of the tires of Working Examples 17 to 28, uneven wear resistance and cracking and fracturing resistance were superior.

The invention claimed is:

1. A pneumatic tire comprising:
   a tread portion extending in a tire circumferential direction and constituting an annular shape;
   a pair of sidewall portions disposed on both sides of the tread portion; and
   a pair of bead portions disposed inward in a tire radial direction of the sidewall portions;
   the tread portion comprising five main grooves extending in the tire circumferential direction and six rows of ribs extending in the tire circumferential direction and partitioned by the main grooves; the ribs being constituted by a pair of center ribs positioned on a tire equatorial plane side, a pair of intermediate ribs positioned outward of each of the center ribs, and a pair of shoulder ribs positioned outward of each of the intermediate ribs;
   one of the five main grooves being positioned between the center ribs and formed to be straight, and only four of the five main grooves having a plurality of protrusions formed periodically on both wall surfaces so as to cause a groove bottom portion to meander;
   a plurality of first sipes being formed in each edge portion, adjacent to the main grooves, of the center ribs, the intermediate ribs, and the shoulder ribs;
   a plurality of first narrow grooves extending in a tire width direction being formed in each of the center ribs and the intermediate ribs so as to form a connection between the main grooves; a plurality of second narrow grooves extending in the tire circumferential direction being formed in each of the center ribs and the intermediate ribs so as to connect neighboring first narrow grooves;
   an interval $Pg_1$ in the tire circumferential direction of the first narrow grooves being from 20 mm to 60 mm; an interval $Ps_1$ in the tire circumferential direction of the first sipes being from 15% to 45% of the interval $Pg_1$ of the first narrow grooves; a ratio Wa/TDW of a width Wa of the center ribs to a development width TDW of the tread portion being from 0.08 to 0.18;

a ratio Wb/TDW of a width Wb of the intermediate ribs to the development width TDW of the tread portion being from 0.08 to 0.18; and a ratio Wc/Wa of a width Wc of the shoulder ribs to the width Wa of the center ribs being from 1.20 to 1.30.

2. The pneumatic tire according to claim 1, wherein:

a length $Ls_1$ of the first sipes is from 1.5 to 8.0 mm; and a ratio $Ds_1$/GD of a depth $Ds_1$ of the first sipes to a depth GD of the main grooves is from 0.30 to 0.90.

3. The pneumatic tire according to claim 2, wherein:

the first narrow grooves locally deepen at an intermediate portion in the longitudinal direction;

the second narrow grooves locally deepen at a connecting portion with the first narrow grooves; and a ratio $Dg_1$/GD of a depth $Dg_1$ of the intermediate portion of the first narrow grooves to the depth GD of the main grooves and a ratio $Dg_2$/GD of a depth $Dg_2$ of the connecting portion of the second narrow grooves to the depth GD of the main grooves are each from 0.30 to 0.80.

4. The pneumatic tire according to claim 3, wherein:

a plurality of second sipes is formed in an outer side edge portion of the shoulder ribs;

an interval $Ps_2$ in the tire circumferential direction of the second sipes is from 3.0 mm to 12.0 mm; and a length $Ls_2$ of the second sipes is from 5.0 mm to 15 mm.

5. The pneumatic tire according to claim 4, wherein a ratio Px/$Pg_1$ of an interval Px in the tire circumferential direction of the protrusion to the interval $Pg_1$ in the tire circumferential direction of the first narrow grooves is from 0.5 to 2.0.

6. The pneumatic tire according to claim 5, wherein:

an inclination angle $\theta_1$ of the first narrow grooves with respect to the tire circumferential direction is from 40° to 90°; and an inclination angle $\theta_2$ of the second narrow grooves with respect to the tire circumferential direction is from 0° to 40°.

7. The pneumatic tire according to claim 6, wherein:

a circumferential reinforcing layer comprising a reinforcing cord oriented in the tire circumferential direction is embedded in the tread portion.

8. The pneumatic tire according to claim 1, wherein:

the first narrow grooves locally deepen at an intermediate portion in the longitudinal direction;

the second narrow grooves locally deepen at a connecting portion with the first narrow grooves; and a ratio $Dg_1$/GD of a depth $Dg_1$ of the intermediate portion of the first narrow grooves to the depth GD of the main grooves and a ratio $Dg_2$/GD of a depth $Dg_2$ of the connecting portion of the second narrow grooves to the depth GD of the main grooves are each from 0.30 to 0.80.

9. The pneumatic tire according to claim 1, wherein:

a plurality of second sipes is formed in an outer side edge portion of the shoulder ribs;

an interval $Ps_2$ in the tire circumferential direction of the second sipes is from 3.0 mm to 12.0 mm; and a length $Ls_2$ of the second sipes is from 5.0 mm to 15 mm.

10. The pneumatic tire according to claim 1, wherein a ratio Px/$Pg_1$ of an interval Px in the tire circumferential direction of the protrusion to the interval $Pg_1$ in the tire circumferential direction of the first narrow grooves is from 0.5 to 2.0.

11. The pneumatic tire according to claim 1, wherein:

an inclination angle $\theta_1$ of the first narrow grooves with respect to the tire circumferential direction is from 40° to 90°; and an inclination angle $\theta_2$ of the second narrow grooves with respect to the tire circumferential direction is from 0° to 40°.

12. The pneumatic tire according to claim 1, wherein:

a circumferential reinforcing layer comprising a reinforcing cord oriented in the tire circumferential direction is embedded in the tread portion.

13. The pneumatic tire according to claim 1, wherein the interval $Pg_1$ in the tire circumferential direction of the first narrow grooves is from 25 mm to 60 mm.

14. The pneumatic tire according to claim 1, wherein the ratio Wc/Wa of the width Wc of the shoulder ribs to the width Wa of the center ribs is from 1.20 to 1.29.

15. A pneumatic tire comprising:

a tread portion extending in a tire circumferential direction and constituting an annular shape;

a pair of sidewall portions disposed on both sides of the tread portion; and a pair of bead portions disposed inward in a tire radial direction of the sidewall portions;

the tread portion comprising five main grooves extending in the tire circumferential direction and six rows of ribs extending in the tire circumferential direction and partitioned by the main grooves; the ribs being constituted by a pair of center ribs positioned on a tire equatorial plane side, a pair of intermediate ribs positioned outward of each of the center ribs, and a pair of shoulder ribs positioned outward of each of the intermediate ribs;

one of the five main grooves being positioned between the center ribs and formed to have a straight groove bottom portion, and four of the five main grooves having a plurality of protrusions formed periodically on both wall surfaces so as to form a meandering groove bottom portion;

a plurality of first sipes being formed in each edge portion, adjacent to the main grooves, of the center ribs, the intermediate ribs, and the shoulder ribs;

a plurality of first narrow grooves extending in a tire width direction being formed in each of the center ribs and the intermediate ribs so as to form a connection between the main grooves; a plurality of second narrow grooves extending in the tire circumferential direction being formed in each of the center ribs and the intermediate ribs so as to connect neighboring first narrow grooves;

an interval $Pg_1$ in the tire circumferential direction of the first narrow grooves being from 20 mm to 60 mm; an interval $Ps_1$ in the tire circumferential direction of the first sipes being from 15% to 45% of the interval $Pg_1$ of the first narrow grooves; a ratio Wa/TDW of a width Wa of the center ribs to a development width TDW of the tread portion being from 0.08 to 0.18;

a ratio Wb/TDW of a width Wb of the intermediate ribs to the development width TDW of the tread portion being from 0.08 to 0.18; and a ratio Wc/Wa of a width Wc of the shoulder ribs to the width Wa of the center ribs being from 1.20 to 1.30.

* * * * *